United States Patent
Hsiao

(10) Patent No.: US 10,719,763 B2
(45) Date of Patent: *Jul. 21, 2020

(54) IMAGE SEARCHING

(71) Applicant: Oath Inc., New York, NY (US)

(72) Inventor: JenHao Hsiao, Taipei (TW)

(73) Assignee: Oath Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/392,305

(22) Filed: Apr. 23, 2019

(65) Prior Publication Data

US 2019/0251438 A1    Aug. 15, 2019

Related U.S. Application Data

(63) Continuation of application No. 15/948,061, filed on Apr. 9, 2018, now Pat. No. 10,268,952, which is a
(Continued)

(51) Int. Cl.
*G06N 3/08* (2006.01)
*G06F 16/583* (2019.01)
*G06N 3/04* (2006.01)

(52) U.S. Cl.
CPC .......... *G06N 3/08* (2013.01); *G06F 16/5838* (2019.01); *G06N 3/0427* (2013.01);
(Continued)

(58) Field of Classification Search
None
See application file for complete search history.

(56) References Cited

U.S. PATENT DOCUMENTS 9,165,369 B1 * 10/2015 Zhang ............... G06K 9/628
9,607,217 B2 * 3/2017 Cetintas ............ G06F 16/58
(Continued)

OTHER PUBLICATIONS

Shen, Yelong, et al. "A latent semantic model with convolutional-pooling structure for information retrieval." Proceedings of the 23rd ACM international conference on conference on information and knowledge management. ACM, 2014. (Year: 2014).*
(Continued)

*Primary Examiner* — Andrae S Allison
(74) *Attorney, Agent, or Firm* — Cooper Legal Group, LLC

(57) ABSTRACT

As provided herein, a domain model, corresponding to a domain of an image, may be merged with a pre-trained fundamental model to generate a trained fundamental model. The trained fundamental model may comprise a feature description of the image converted into a binary code. Responsive to a user submitting a search query, a coarse image search may be performed, using a search query binary code derived from the search query, to identify a candidate group, comprising one or more images, having binary codes corresponding to the search query binary code. A fine image search may be performed on the candidate group utilizing a search query feature description derived from the search query. The fine image search may be used to rank images within the candidate group based upon a similarity between the search query feature description and feature descriptions of the one or more images within the candidate group.

20 Claims, 8 Drawing Sheets

Related U.S. Application Data continuation of application No. 14/730,476, filed on Jun. 4, 2015, now Pat. No. 9,940,575.

(52) U.S. Cl.
CPC .......... *G06N 3/0454* (2013.01); *G06N 3/084* (2013.01); *Y04S 10/54* (2013.01)

(56) References Cited

U.S. PATENT DOCUMENTS

| | | | |
|---|---|---|---|
| 9,633,282 B2* | 4/2017 | Sharma | G06K 9/6256 |
| 2015/0278200 A1* | 10/2015 | He | G06F 17/2785 |
| | | | 704/2 |
| 2016/0104058 A1* | 4/2016 | He | G06K 9/6255 |
| | | | 382/156 |
| 2016/0267637 A1* | 9/2016 | Hsiao | G06F 16/24578 |
| 2016/0275111 A1* | 9/2016 | Hsiao | G06F 16/5838 |
| 2016/0342863 A1* | 11/2016 | Kwon | G06K 9/4647 |
| 2016/0350336 A1* | 12/2016 | Checka | G06K 9/6215 |
| 2017/0083792 A1* | 3/2017 | Rodriguez-Serrano | |
| | | | G06F 16/54 |

OTHER PUBLICATIONS

Aviles-Cruz, Carlos, et al. "Coarse-Fine Convolutional Deep-Learning Strategy for Human Activity Recognition." Sensors 19.7 (2019): 1556. (Year: 2019).*

Yan, Yan, et al. "Semantic indexing with deep learning: a case study." Big Data Analytics 1.1 (2016): 7. (Year: 2016).*

* cited by examiner

IMAGE SEARCHING

RELATED APPLICATIONS

This application claims priority to and is a continuation of U.S. application Ser. No. 15/948,061, filed on Apr. 9, 2018, entitled "IMAGE SEARCHING", which claims priority to and is a continuation of U.S. application Ser. No. 14/730,476, filed on Jun. 4, 2015, entitled "IMAGE SEARCHING". U.S. application Ser. No. 15/948,061 and U.S. application Ser. No. 14/730,476 are both incorporated herein.

BACKGROUND

A user may search for images through various search interfaces, such as a file system search, a social network search, a search engine, etc. Unfortunately, image search results for the image search may have limited accuracy. Image search techniques may rely on low level and/or hand crafted features. Low level and/or hand crafted features may provide limited and low level descriptions about images, which may fail to describe the images comprehensively. Additionally, image search techniques may utilize a linear search technique. Linear search techniques may have relatively slow retrieval speeds and may be resource intensive due to searching relatively large volumes of available data (e.g., a relatively large number of images within a database that is to be searched).

SUMMARY

In accordance with the present disclosure, one or more systems and/or methods for image searching are provided. In an example, a feature description of an image may be output from a fully connected layer of a pre-trained fundamental model (e.g., a convolutional neural network). A domain of the image may be identified. A domain model, corresponding to the domain, may be merged with the pre-trained fundamental model to generate the trained fundamental model. The trained fundamental model may comprise the fully connected layer (e.g., such as a first fully connected layer, a second fully connected layer, and/or a latent layer). The domain model may be trained to learn visual descriptors (e.g., visual features of content comprised in images) corresponding to the domain to generate learned descriptors. The learned descriptors may be utilized as feature descriptions for identifying query results. The domain model may be merged with the pre-trained fundamental model to create the trained fundamental model by learning binary codes from the pre-trained fundamental model. The trained fundamental layer may comprise a first convolutional layer, a second convolutional layer, a third convolutional layer, a fourth convolutional layer, and/or a fifth convolutional layer. The latent layer may be utilized to convert a first query output, of the first fully connected layer comprising the feature description, into a binary code. The binary code may describe latent semantic content of the image. The second fully connected layer may be utilized to encode semantic information of a second query output of the latent layer. The learned features may be merged into the trained fundamental model utilizing back-propagation.

Responsive to a user submitting a search query, a coarse image search may be performed using a search query binary code derived from the search query (e.g., such as by utilizing a second query output of the latent layer). The coarse image search may identify a candidate group, comprising one or more images, having binary codes corresponding to the search query binary code.

A fine image search may be performed on the candidate group utilizing a search query feature description derived from the search query. The fine image search may be used to rank the one or more images within the candidate group based upon a similarity between the search query feature description and feature descriptions of the one or more images within the candidate group. First query outputs of the first fully connected layer may be utilized to rank the one or more images comprised in the candidate group. Responsive to the image comprising a rank above a ranking threshold, the image may be presented to the user as a query result for the search query.

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

1. Computing Scenario

The following provides a discussion of some types of computing scenarios in which the disclosed subject matter may be utilized and/or implemented.

1.1. Networking

Figure 1:
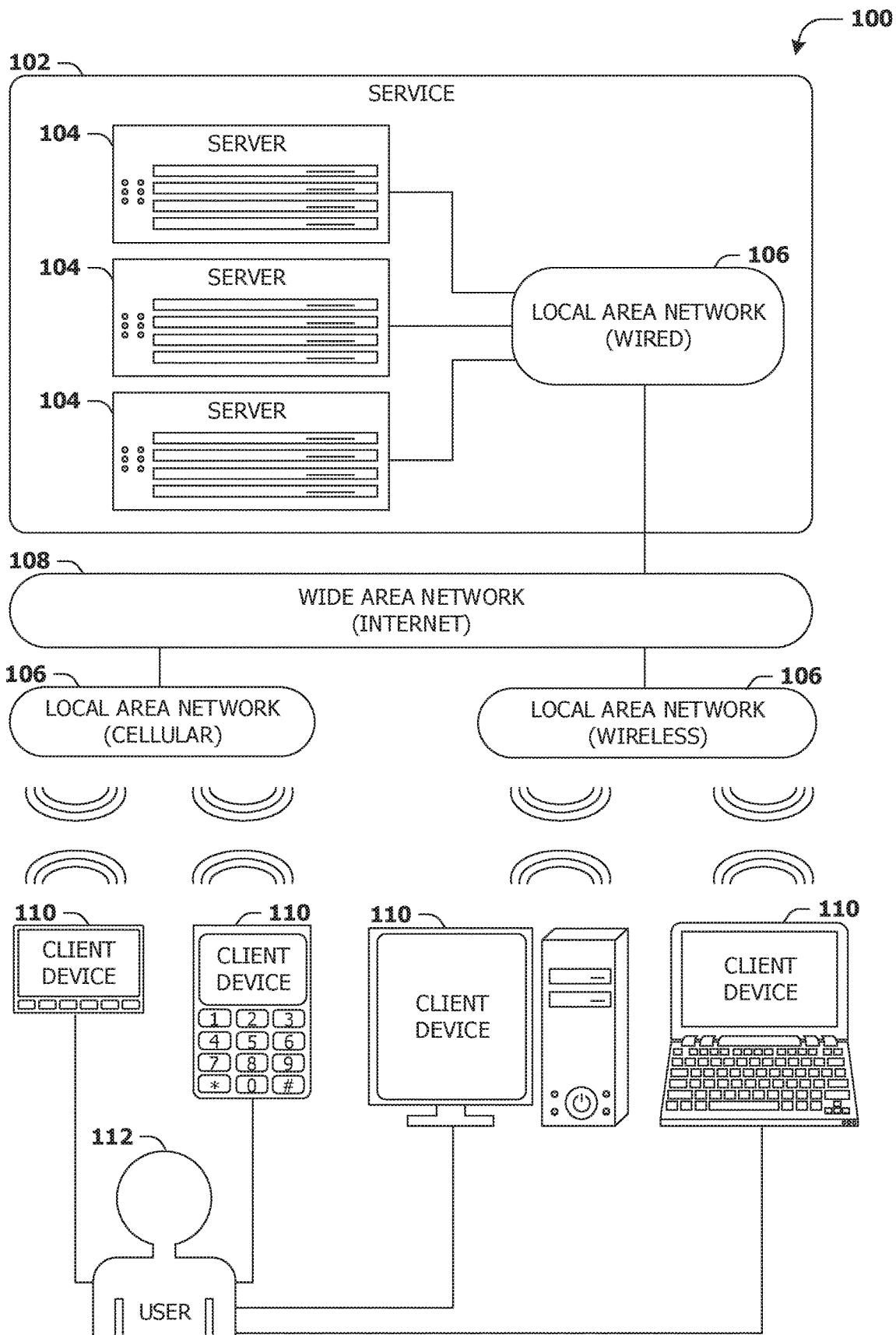
FIG. 1 is an illustration of a scenario involving various examples of networks that may connect servers and clients.

FIG. 1 is an interaction diagram of a scenario 100 illustrating a service 102 provided by a set of servers 104 to a set of client devices 110 via various types of networks. The servers 104 and/or client devices 110 may be capable of transmitting, receiving, processing, and/or storing many types of signals, such as in memory as physical memory states.

The servers 104 of the service 102 may be internally connected via a local area network 106 (LAN), such as a wired network where network adapters on the respective servers 104 are interconnected via cables (e.g., coaxial and/or fiber optic cabling), and may be connected in various topologies (e.g., buses, token rings, meshes, and/or trees). The servers 104 may be interconnected directly, or through one or more other networking devices, such as routers, switches, and/or repeaters. The servers 104 may utilize a variety of physical networking protocols (e.g., Ethernet and/or Fibre Channel) and/or logical networking protocols (e.g., variants of an Internet Protocol (IP), a Transmission Control Protocol (TCP), and/or a User Datagram Protocol (UDP). The local area network 106 may include, e.g., analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. The local area network 106 may be organized according to one or more network architectures, such as server/client, peer-to-peer, and/or mesh architectures, and/or a variety of roles, such as administrative servers, authentication servers, security monitor servers, data stores for objects such as files and databases, business logic servers, time synchronization servers, and/or front-end servers providing a user-facing interface for the service 102.

Likewise, the local area network 106 may comprise one or more sub-networks, such as may employ differing architectures, may be compliant or compatible with differing protocols and/or may interoperate within the local area network 106. Additionally, a variety of local area networks 106 may be interconnected; e.g., a router may provide a link between otherwise separate and independent local area networks 106.

In the scenario 100 of FIG. 1, the local area network 106 of the service 102 is connected to a wide area network 108 (WAN) that allows the service 102 to exchange data with other services 102 and/or client devices 110. The wide area network 108 may encompass various combinations of devices with varying levels of distribution and exposure, such as a public wide-area network (e.g., the Internet) and/or a private network (e.g., a virtual private network (VPN) of a distributed enterprise).

In the scenario 100 of FIG. 1, the service 102 may be accessed via the wide area network 108 by a user 112 of one or more client devices 110, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 110 may communicate with the service 102 via various connections to the wide area network 108. As a first such example, one or more client devices 110 may comprise a cellular communicator and may communicate with the service 102 by connecting to the wide area network 108 via a wireless local area network 106 provided by a cellular provider. As a second such example, one or more client devices 110 may communicate with the service 102 by connecting to the wide area network 108 via a wireless local area network 106 provided by a location such as the user's home or workplace (e.g., a WiFi network or a Bluetooth personal area network). In this manner, the servers 104 and the client devices 110 may communicate over various types of networks. Other types of networks that may be accessed by the servers 104 and/or client devices 110 include mass storage, such as network attached storage (NAS), a storage area network (SAN), or other forms of computer or machine readable media.

1.2. Server Configuration

Figure 2:
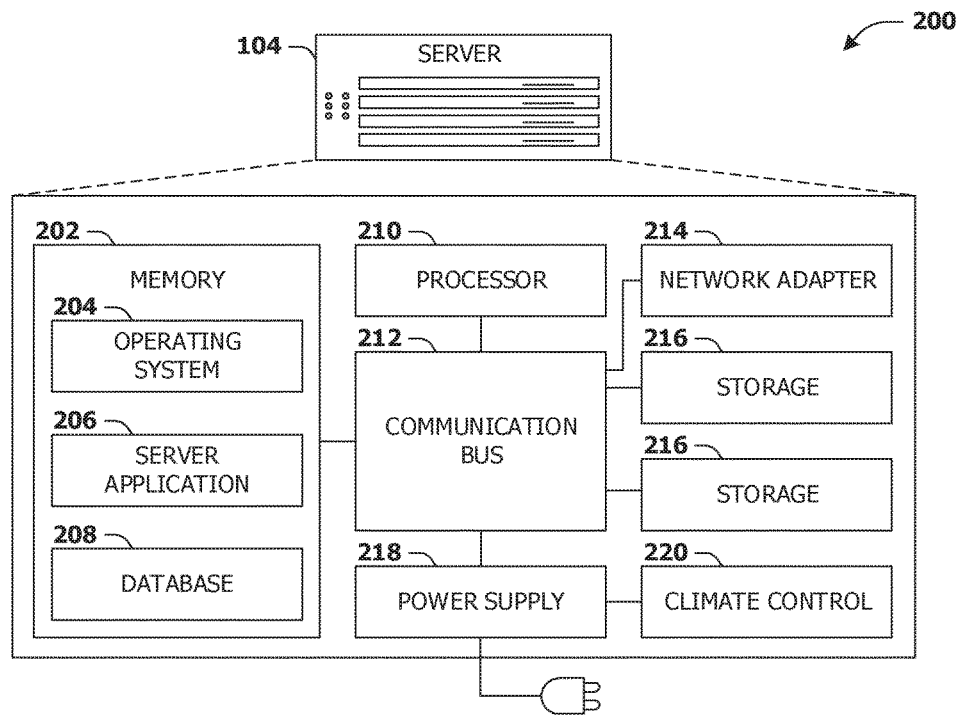
FIG. 2 is an illustration of a scenario involving an example configuration of a server that may utilize and/or implement at least a portion of the techniques presented herein.

FIG. 2 presents a schematic architecture diagram 200 of a server 104 that may utilize at least a portion of the techniques provided herein. Such a server 104 may vary widely in configuration or capabilities, alone or in conjunction with other servers, in order to provide a service such as the service 102.

The server 104 may comprise one or more processors 210 that process instructions. The one or more processors 210 may optionally include a plurality of cores; one or more coprocessors, such as a mathematics coprocessor or an integrated graphical processing unit (GPU); and/or one or more layers of local cache memory. The server 104 may comprise memory 202 storing various forms of applications, such as an operating system 204; one or more server applications 206, such as a hypertext transport protocol (HTTP) server, a file transfer protocol (FTP) server, or a simple mail transport protocol (SMTP) server; and/or various forms of data, such as a database 208 or a file system. The server 104 may comprise a variety of peripheral components, such as a wired and/or wireless network adapter 214 connectible to a local area network and/or wide area network; one or more storage components 216, such as a hard disk drive, a solid-state storage device (SSD), a flash memory device, and/or a magnetic and/or optical disk reader.

The server 104 may comprise a mainboard featuring one or more communication buses 212 that interconnect the processor 210, the memory 202, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 212 may interconnect the server 104 with at least one other server. Other components that may optionally be included with the server 104 (though not shown in the schematic diagram 200 of FIG. 2) include a display; a display adapter, such as a graphical processing unit (GPU); input peripherals, such as a keyboard and/or mouse; and a flash memory device that may store a basic input/output system (BIOS) routine that facilitates booting the server 104 to a state of readiness.

The server 104 may operate in various physical enclosures, such as a desktop or tower, and/or may be integrated with a display as an "all-in-one" device. The server 104 may be mounted horizontally and/or in a cabinet or rack, and/or may simply comprise an interconnected set of components. The server 104 may comprise a dedicated and/or shared power supply 218 that supplies and/or regulates power for the other components. The server 104 may provide power to and/or receive power from another server and/or other devices. The server 104 may comprise a shared and/or dedicated climate control unit 220 that regulates climate properties, such as temperature, humidity, and/or airflow. Many such servers 104 may be configured and/or adapted to utilize at least a portion of the techniques presented herein.

1.3. Client Device Configuration

Figure 3:
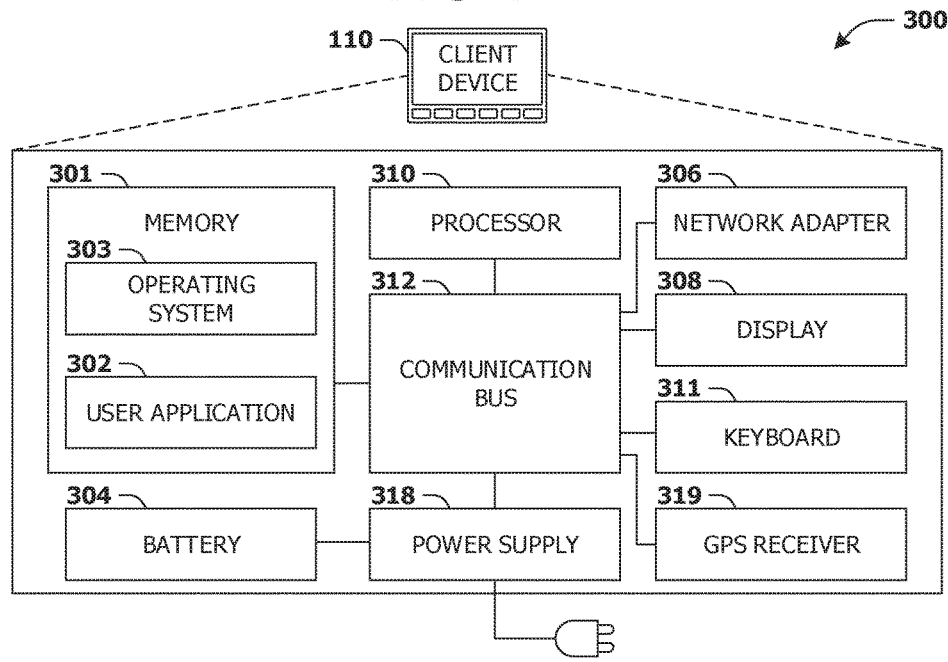
FIG. 3 is an illustration of a scenario involving an example configuration of a client that may utilize and/or implement at least a portion of the techniques presented herein.

FIG. 3 presents a schematic architecture diagram 300 of a client device 110 whereupon at least a portion of the techniques presented herein may be implemented. Such a client device 110 may vary widely in configuration or capabilities, in order to provide a variety of functionality to a user such as the user 112. The client device 110 may be provided in a variety of form factors, such as a desktop or tower workstation; an "all-in-one" device integrated with a display 308; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 110 may serve the user in a variety of roles, such as a workstation, kiosk, media player, gaming device, and/or appliance.

The client device 110 may comprise one or more processors 310 that process instructions. The one or more processors 310 may optionally include a plurality of cores; one or more coprocessors, such as a mathematics coprocessor or an integrated graphical processing unit (GPU); and/or one or more layers of local cache memory. The client device 110 may comprise memory 301 storing various forms of applications, such as an operating system 303; one or more user applications 302, such as document applications, media applications, file and/or data access applications, communication applications such as web browsers and/or email clients, utilities, and/or games; and/or drivers for various peripherals. The client device 110 may comprise a variety of peripheral components, such as a wired and/or wireless network adapter 306 connectible to a local area network and/or wide area network; one or more output components, such as a display 308 coupled with a display adapter (optionally including a graphical processing unit (GPU)), a sound adapter coupled with a speaker, and/or a printer; input devices for receiving input from the user, such as a keyboard 311, a mouse, a microphone, a camera, and/or a touch-sensitive component of the display 308; and/or environmental sensors, such as a global positioning system (GPS) receiver 319 that detects the location, velocity, and/or acceleration of the client device 110, a compass, accelerometer, and/or gyroscope that detects a physical orientation of the client device 110. Other components that may optionally be included with the client device 110 (though not shown in the schematic diagram 300 of FIG. 3) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 110 to a state of readiness; and a climate control unit that regulates climate properties, such as temperature, humidity, and airflow.

The client device 110 may comprise a mainboard featuring one or more communication buses 312 that interconnect the processor 310, the memory 301, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 110 may comprise a dedicated and/or shared power supply 318 that supplies and/or regulates power for other components, and/or a battery 304 that stores power for use while the client device 110 is not connected to a power source via the power supply 318. The client device 110 may provide power to and/or receive power from other client devices.

In some scenarios, as a user 112 interacts with a software application on a client device 110 (e.g., an instant messenger and/or electronic mail application), descriptive content in the form of signals or stored physical states within memory (e.g., an email address, instant messenger identifier, phone number, postal address, message content, date, and/or time) may be identified. Descriptive content may be stored, typically along with contextual content. For example, the source of a phone number (e.g., a communication received from another user via an instant messenger application) may be stored as contextual content associated with the phone number. Contextual content, therefore, may identify circumstances surrounding receipt of a phone number (e.g., the date or time that the phone number was received), and may be associated with descriptive content. Contextual content, may, for example, be used to subsequently search for associated descriptive content. For example, a search for phone numbers received from specific individuals, received via an instant messenger application or at a given date or time, may be initiated. The client device 110 may include one or more servers that may locally serve the client device 110 and/or other client devices of the user 112 and/or other individuals. For example, a locally installed webserver may provide web content in response to locally submitted web requests. Many such client devices 110 may be configured and/or adapted to utilize at least a portion of the techniques presented herein.

2. Presented Techniques

One or more systems and/or techniques for image searching are provided. Some traditional image searching techniques may lack an ability to provide accurate image search results to users. The traditional image searching techniques may rely on low level and/or hand crafted features that may fail to describe images comprehensively. Further, the traditional image searching techniques may utilize linear search methods, which may be resource intensive and have slow retrieval times.

As provided herein, a feature description of an image may be output from a fully connected layer of a pre-trained fundamental model (e.g., a convolutional neural network). The feature description may correspond to any type of image feature, such as shapes identified from edge detection, corner detection, blob detection, ridge detection, scale-invariant feature transformation, curvature detection, thresholding, template matching, Hough transformation, and/or a variety of other image feature types corresponding to shapes, coloration, and/or other visual properties of the image. A domain model, corresponding to a domain of the image (e.g., an object class, such as clothing, cars, children, and/or other objects that may be identified within an image), may be merged with the pre-trained fundamental model to generate a trained fundamental model. The feature description may be converted into a binary code because the binary code may provide a relatively quick and efficient search criteria for performing a coarse image search used to identify a candidate group of images (e.g., a number of images to search using a fine image search may be narrowed down to the candidate group of images).

Responsive to a user submitting a search query, the coarse image search may be performed using a search query binary code derived from the search query (e.g., such as by utilizing a second query output of the latent layer). The coarse image search may identify a candidate group, comprising one or more images, having binary codes corresponding to the search query binary code. A fine image search may be performed on the candidate group utilizing a search query feature description derived from the search query. The fine image search may be relatively more accurate than the coarse image search, and may be relatively efficient because the fine image search is merely performed on the candidate group of images. The fine image search may be used to rank the one or more images within the candidate group based upon a similarity between the search query feature description and feature descriptions of the one or more images within the candidate group.

By utilizing the binary code to perform the coarse image search and the feature description to perform the fine image search (e.g., utilizing high level semantic descriptions), image searching may have increased accuracy as compared to traditional image searching techniques. Retrieval speeds of images may be increased (e.g., up to fifty times) as compared to traditional image search techniques based upon the utilization of the binary code. Further, retrieval speeds may be minimally affected by a size of an image database that may be searched.

Figure 4:
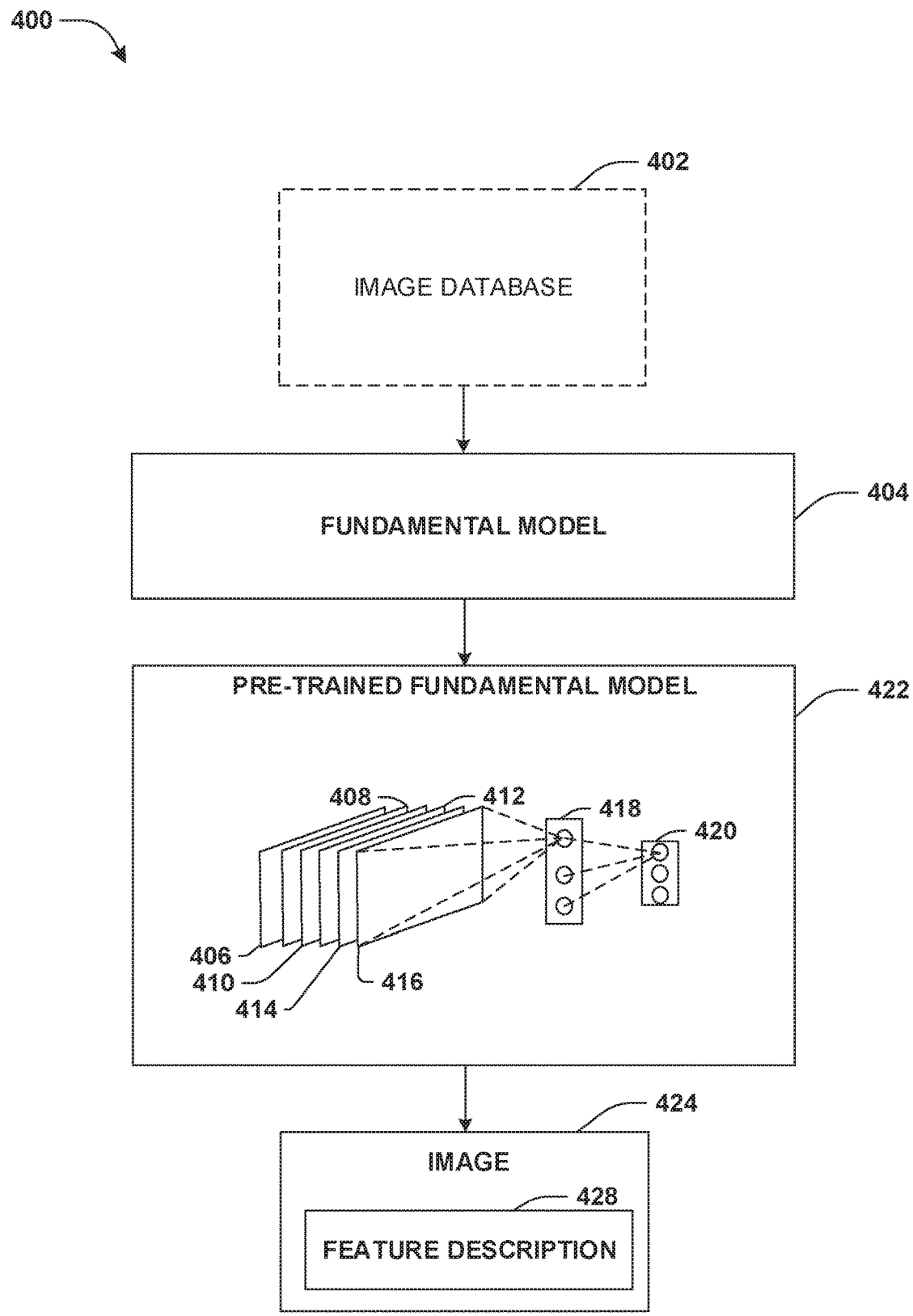
FIG. 4 component block diagram illustrating an example system for training a fundamental model.

FIG. 4 is an illustration of a component block diagram illustrating an example system 400 for training a fundamental model 404 (e.g., a convolutional neural network). The fundamental model 404 may be trained using images from an image database 402. In an example, the image database 402 may comprise a relatively large number of images (e.g., about 1 million to about 2 million images, or any other number) on a 1000-category image classification task or any other category image classification task. A pre-trained fundamental model 422 may be created using the image database 402 and the fundamental model 404. The pre-trained fundamental model 422 may comprise a convolutional layer. The convolutional layer may comprise a first convolutional layer 406, a second convolutional layer 408, a third convolutional layer 410, a fourth convolutional layer 412, a fifth convolutional layer 414, or any other number of convolutional layers.

The pre-trained fundamental model 422 may comprise a fully connected layer. The fully connected layer may comprise an initial fully connected layer 416, a first fully connected layer 418, and/or a second fully connected layer 420. The pre-trained fundamental model 422 may utilize max-pooling operation and/or a rectified linear unit (ReLU). In an example, the initial fully connected layer 416 and/or the first fully connected layer 418 may comprise about 4,096 nodes or any other number of nodes. A first query output of the first fully connected layer 418 of the pre-trained fundamental model 422 may comprise a feature description 428 of an image 424. In an example, the first query output of the first fully connected layer 418 may be input into a 1,000 way-softmax comprised within the second fully connected layer 420. The second fully connected layer 420 may output a probability distribution over domains.

Figure 5:
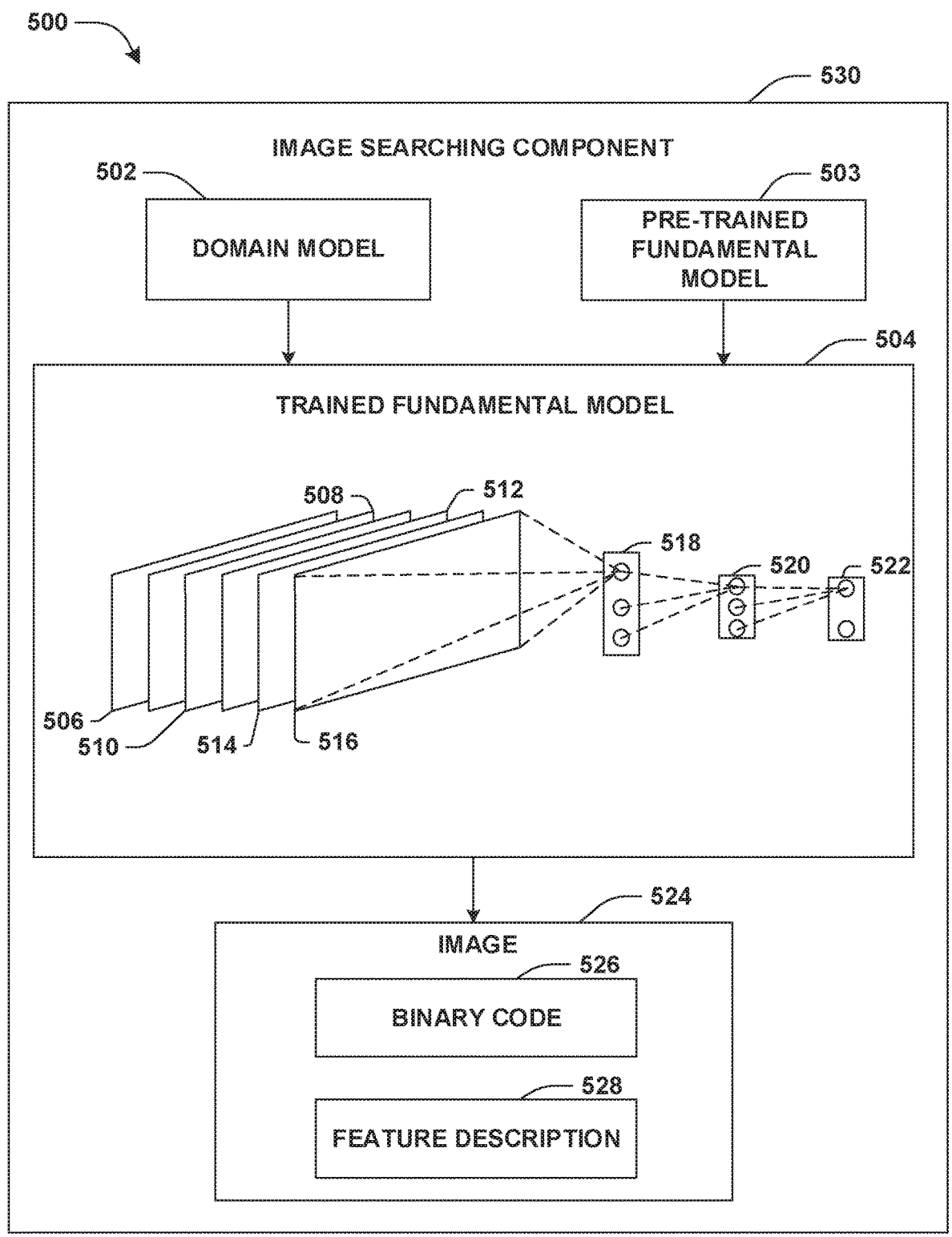
FIG. 5 is a component block diagram illustrating an example system for image searching, where a domain model is merged with a pre-trained fundamental model.

FIG. 5 is an illustration of a component block diagram illustrating an example system 500 for merging a domain model 502 with a pre-trained fundamental model 503 to generate a trained fundamental model 504 utilizing an image searching component 530. In an example, merging the domain model 502 may comprise utilizing a domain specific image data set (e.g., comprising 100 categories, or some other number of categories) to train the pre-trained fundamental model 503 to generate the trained fundamental model 504. The trained fundamental model 504 may comprise a convolutional layer. The convolutional layer may comprise a first convolutional layer 506, a second convolutional layer 508, a third convolutional layer 510, a fourth convolutional layer 512, a fifth convolutional layer 514, or any other number of convolutional layers.

The trained fundamental model 504 may comprise an initial fully connected layer 516, a first fully connected layer 518, a latent layer 520, and/or a second fully connected layer 522. The domain model 502 may be merged by learning binary codes from the pre-trained fundamental model 503. The domain model 502 may be trained to learn visual descriptors (e.g., visual features of content comprised in images, such as shapes) corresponding to a domain (e.g., a genre of images such as images of houses or other objects, a product area, etc.) to generate learned descriptors. In an example, the learned descriptors may correspond to the domain. A learned descriptor may comprise a feature description 528 of an image 524 for image retrieval. The learned features may be merged into the trained fundamental model 504 utilizing back-propagation.

The latent layer 520 may be utilized to convert a first query output, of the first fully connected layer 518 comprising the feature description, into a binary code 526. In an example, the first query output may be converted into the binary code by utilizing neurons in the latent layer 520. The neurons may be activated by utilizing a sigmoid function such that activations may be approximated into {0, 1}. The binary code 526 may describe latent semantic content of the image 524 (e.g., the image may relate to a beach). The binary code 526 may represent a number of hidden concepts/attributes with each hidden attribute either one of on or off. A second query output of the latent layer 520 may comprise 128 nodes or some other number of nodes. In this way, the image 524 may be associated with the binary code 526. The identification of the domain may depend on the binary code 526 rather than on feature descriptions.

The second fully connected layer 522 (e.g., comprising 15 nodes, or some other number of nodes) may be utilized to encode semantic information of the second query output of the latent layer 520. Pre-trained weights (e.g., a weight given to a layer) and latent layer weights (e.g., a weight of the latent layer 520) may be randomly initialized. A stochastic gradient descent (SGD) may be performed to refine the pre-trained weights and/or the latent layer weights by maximizing a multinomial logistic regression objective. The pre-trained weights and/or the latent layer weights may evolve into the domain model 502 (e.g., a multi-layer function). The trained fundamental model 504 may learn feature descriptions and binary codes for image retrieval.

Figure 6A:
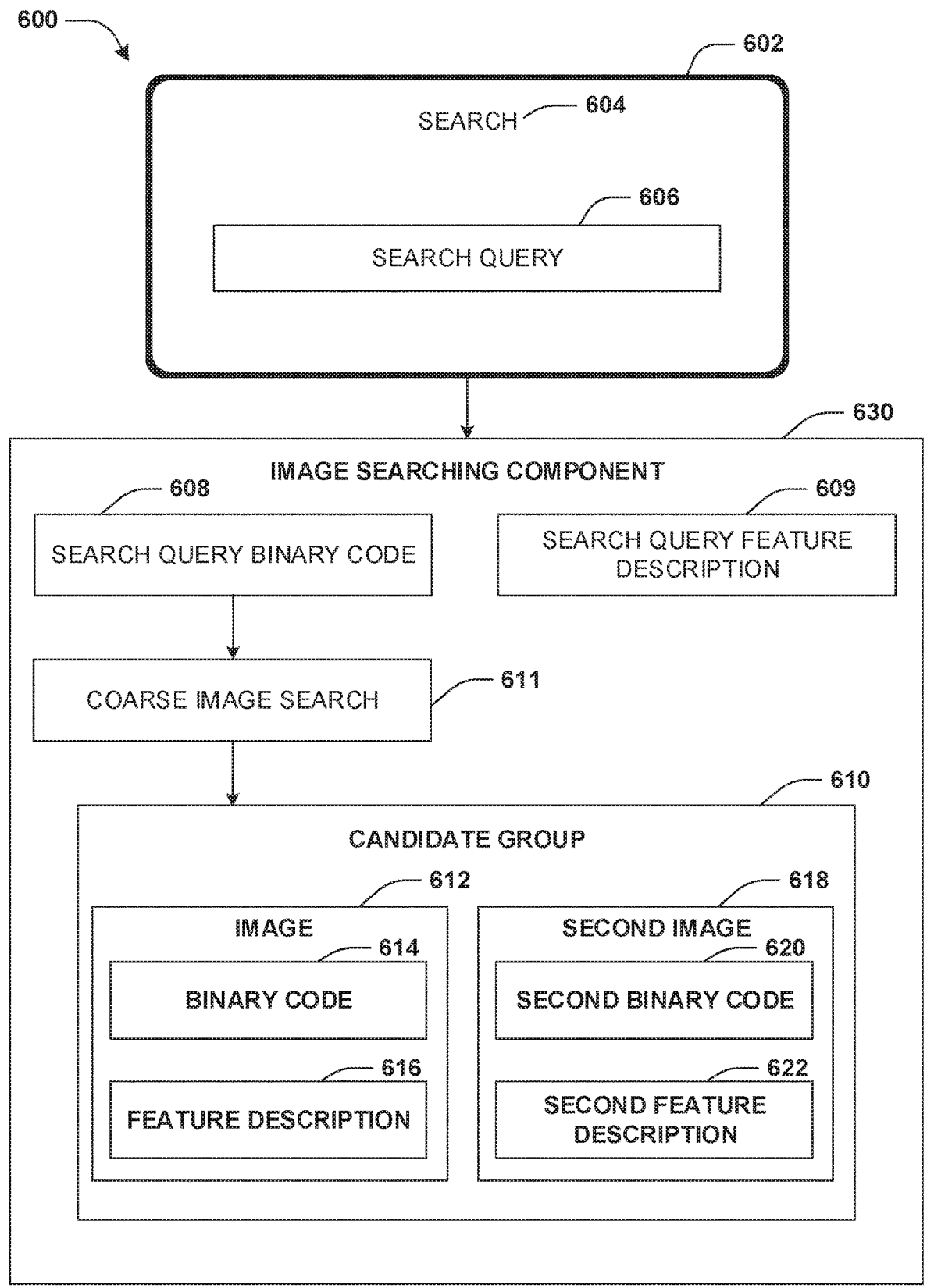
FIG. 6A is a component block diagram illustrating an example system for image searching, where a coarse image search is performed.
Figure 6B:
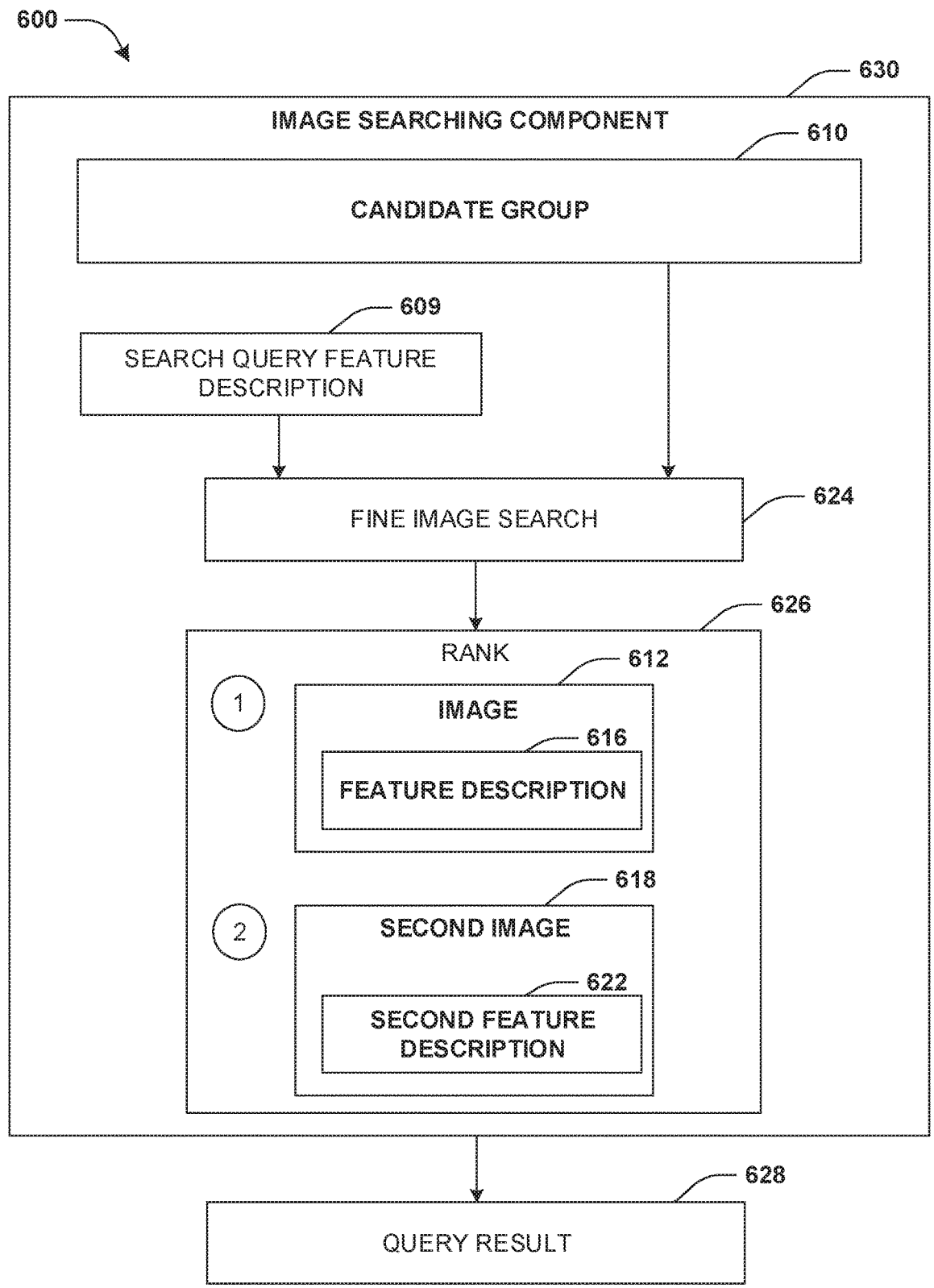
FIG. 6B is a component block diagram illustrating an example system for image searching, where a fine image search is performed.

FIGS. 6A-6B illustrate a component block diagram illustrating an example system 600 for searching for an image using an image searching component 630. A user, of a client device 602, may enter a search query 606 (e.g., an image query) into a search website 604. The search query 606 may be provided to the image searching component 630. The image searching component 630 may derive a search query binary code 608 and/or a search query feature description 609 from the search query 606. In an example, the search query binary code 608 may be extracted from a second query output of a latent layer. The search query binary code 608 may be utilized to perform a coarse image search 611. A candidate group 610, comprising one or more images (e.g., an image 612, a second image 618, and/or other images not illustrated), having binary codes corresponding to the search query binary code 608 may be identified. The candidate group 610 may comprise images with a Hamming distance less than a threshold. In an example, the candidate group 610 may comprise the image 612, comprising a binary code 614 and/or a feature description 616, and the second image 618, comprising a second binary code 620 and/or a second feature description 622. In an example, the binary code 614 and/or the second binary code 620 may correspond to the search query binary code 608 (e.g., binary codes that exceed a threshold similarity).

FIG. 6B illustrates the image searching component 630 performing a fine image search 624. The fine image search 624 may be performed on the candidate group 610 (e.g., the image 612, the second image 618, etc.) utilizing the search query feature description 609 derived from the search query 606. A first query output of a first fully connected layer may be used to rank 626 the one or more images within the candidate group 610. In an example, the ranking 626 may be based upon a similarity between the search query feature description 609 and feature descriptions of the one or more images within the candidate group 610. In an example, the similarity may be determined based upon a Euclidean distance between feature descriptions of the one or more images. Responsive to the image 612 compromising a ranking above a ranking threshold, the image 612 may presented to the user as a query result 628 for the search query 606. In an example, responsive to the second image 618 compromising a ranking below the ranking threshold, the second image 618 may not be presented to the user as the query result 628.

Figure 7:
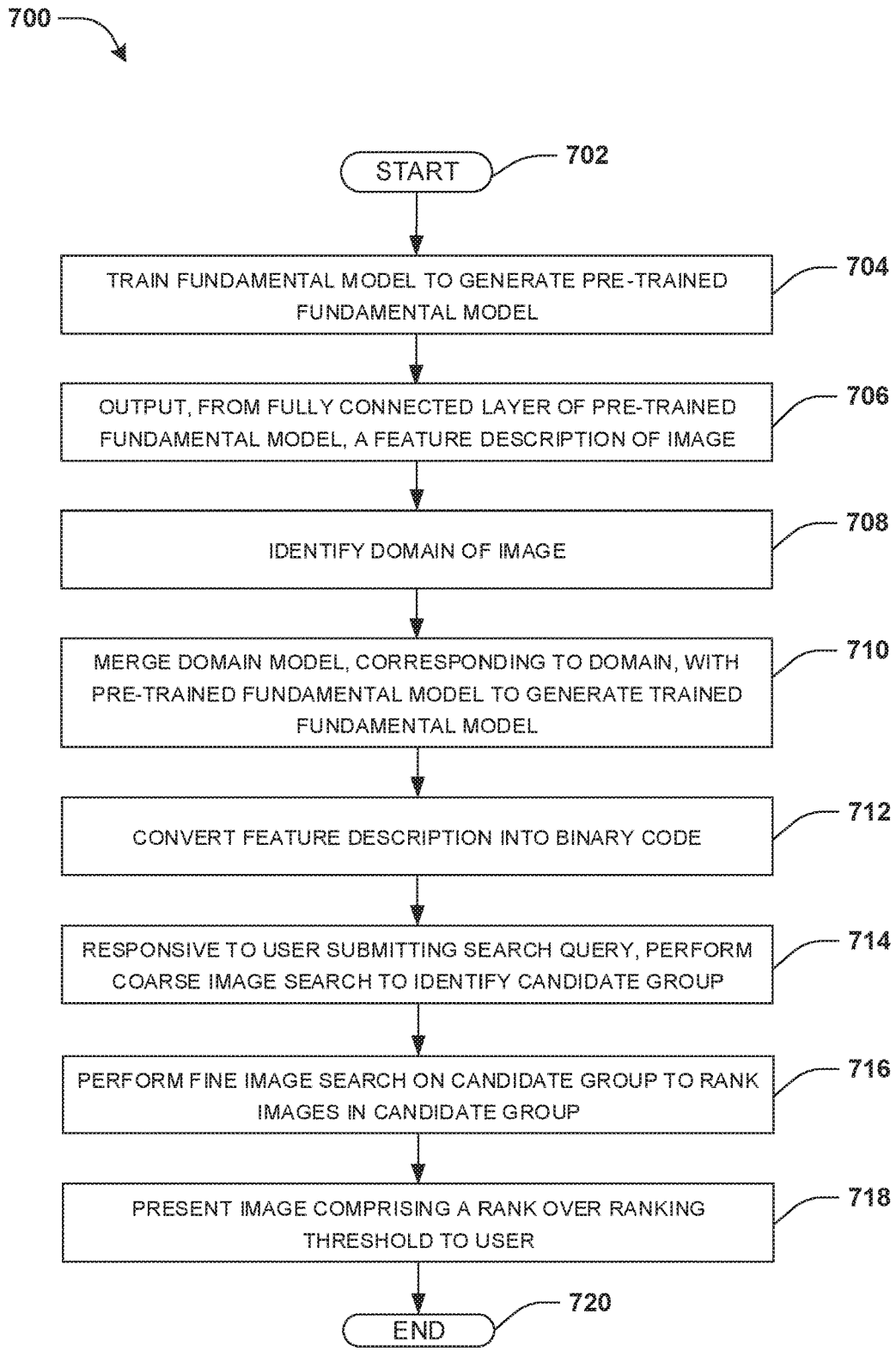
FIG. 7 is a flow chart illustrating an example method for image searching.

An embodiment of image searching is illustrated by an example method 700 of FIG. 7. At 702, the method 700 starts. At 704, a fundamental model may be trained using an image database to create a pre-trained fundamental model. In an example, the pre-trained fundamental model may comprise a convolutional layer and a fully connected layer. At 706, a feature description of an image may be output from the fully connected layer of the pre-trained fundamental model. At 708, a domain of the image may be identified. At 710, a domain model, corresponding to the domain, may be merged with the pre-trained fundamental model to generate a trained fundamental model. At 712, the feature description may be converted into a binary code. At 714, responsive to a user submitting a search query, a coarse image search may be performed using a search query binary code. The search query binary code may be derived from the search query. The coarse image search may be used to identify a candidate group. The candidate group may comprise one or more images having binary codes corresponding to the search query binary code. At 716, a fine image search may be performed on the candidate group utilizing a search query feature description derived from the search query. The fine image search may rank the one or more images within the candidate group based upon a similarity between the search query feature description and feature descriptions of the one or more images within the candidate group. At 718, responsive to the image comprising a rank above a ranking threshold, the image may be presented to the user as a query result for the search query. At 720, the method 700 ends.

Figure 8:
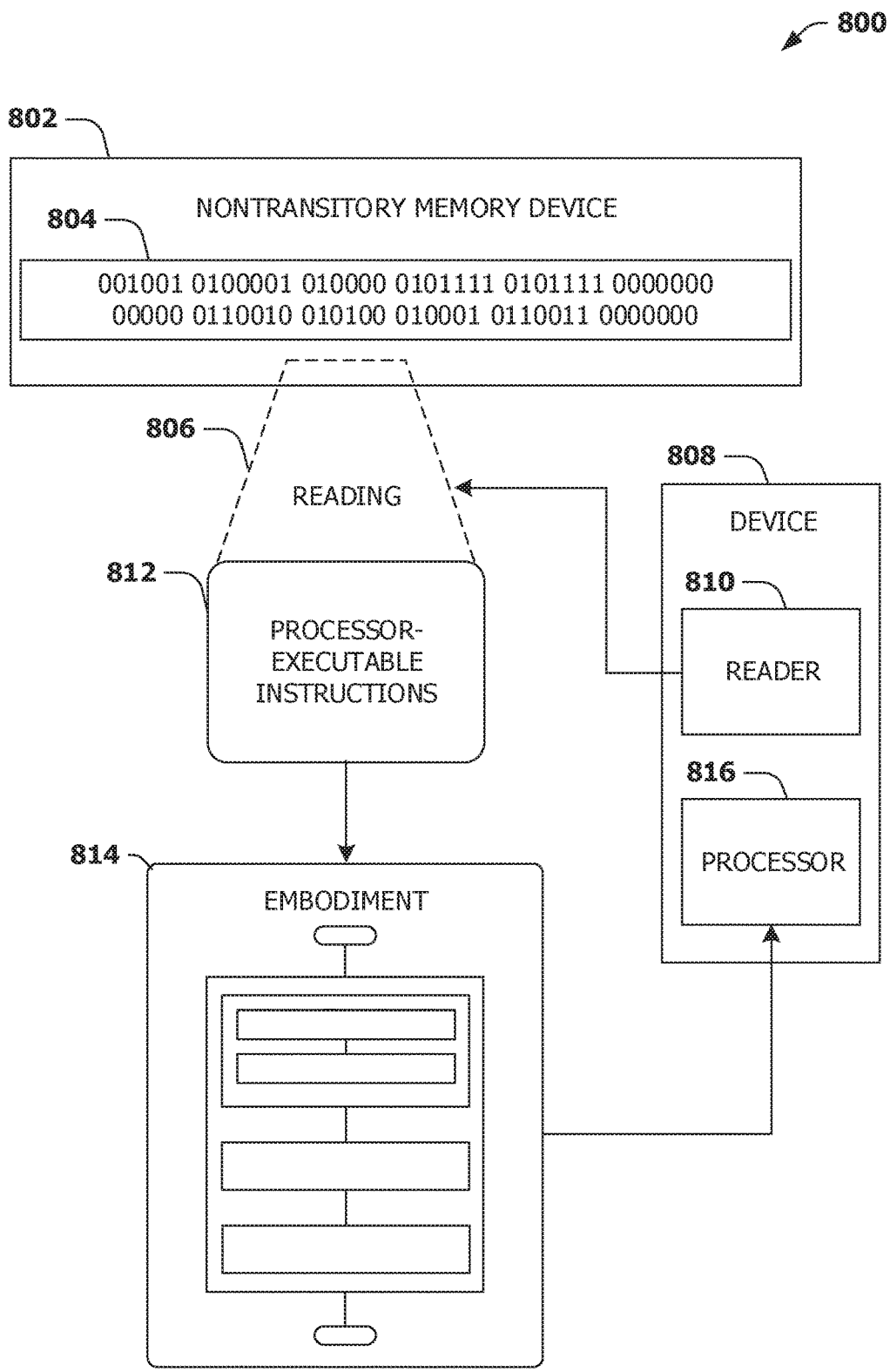
FIG. 8 is an illustration of a scenario featuring an example nontransitory memory device in accordance with one or more of the provisions set forth herein.

FIG. 8 is an illustration of a scenario 800 involving an example nontransitory memory device 802. The nontransitory memory device 802 may comprise instructions that when executed perform at least some of the provisions herein. The nontransitory memory device may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a CD, DVD, or floppy disk). The example nontransitory memory device 802 stores computer-readable data 804 that, when subjected to reading 806 by a reader 810 of a device 808 (e.g., a read head of a hard disk drive, or a read operation invoked on a solid-state storage device), express processor-executable instructions 812. In some embodiments, the processor-executable instructions, when executed on a processor 816 of the device 808, are configured to perform a method, such as at least some of the example method 700 of FIG. 7, for example. In some embodiments, the processor-executable instructions, when executed on the processor 816 of the device 808, are configured to implement a system, such as at least some of the example system 400 of FIG. 4, at least some of the example system 500 of FIG. 5, and/or at least some of the example system 600 of FIGS. 6A-6B, for example.

3. Usage of Terms

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A system for image searching, comprising:
   a processor; and
   memory comprising processor-executable instructions that when executed by the processor cause implementation of an image searching component configured to:
   convert a feature description of an image into a binary code using a trained fundamental model;
   responsive to a user submitting a search query, perform a coarse image search using a search query binary code derived from the search query to identify a candidate group, comprising one or more images; and
   perform a fine image search on the candidate group utilizing a search query feature description derived from the search query to rank the one or more images within the candidate group, the candidate group comprising the image having the feature description.

2. The system of claim 1, the image searching component configured to:
   responsive to the image comprising a ranking above a ranking threshold, present the image to the user as a query result for the search query.

3. The system of claim 1, the image searching component configured to:
   create the trained fundamental model to comprise a first convolutional layer, a second convolutional layer, a third convolutional layer, a fourth convolutional layer, and a fifth convolutional layer.

4. The system of claim 1, the image searching component configured to:
   create the trained fundamental model to comprise a first fully connected layer, a second fully connected layer, and a latent layer.

5. The system of claim 4, the image searching component configured to:
   utilize the latent layer to convert a first query output, of the first fully connected layer comprising the feature description, into the binary code describing latent semantic content of the image.

6. The system of claim 5, the image searching component configured to:
   utilize the second fully connected layer to encode semantic information of a second query output of the latent layer.

7. The system of claim 5, the image searching component configured to:
   input the search query into the coarse image search; and
   generate, using the coarse image search, the search query binary code by utilizing a second query output of the latent layer.

8. The system of claim 5, the image searching component configured to:
   input the candidate group into the fine image search; and
   utilize one or more first query outputs of the first fully connected layer, using the fine image search, to rank the one or more images comprised in the candidate group.

9. The system of claim 1, the trained fundamental model comprising a convolutional neural network.

10. The system of claim 1, the image searching component configured to:
    transfer learned descriptors to the trained fundamental model, from a pre-trained fundamental model, utilizing back-propagation.

11. The system of claim 1, the image searching component configured to:
    train the trained fundamental model to learn binary codes from a pre-trained fundamental model and a domain model.

12. A method of image searching comprising:
    converting a feature description of an image into a binary code;
    responsive to a user submitting a search query, performing a coarse image search using a search query binary code derived from the search query to identify a candidate group, comprising one or more images; and
    performing a fine image search on the candidate group utilizing a search query feature description derived from the search query to rank the one or more images within the candidate group, the candidate group comprising the image having the feature description.

13. The method of claim 12, comprising:
    responsive to the image comprising a rank above a ranking threshold, presenting the image to the user as a query result for the search query.

14. The method of claim 12, comprising:
    creating a trained fundamental model to comprise at least one of a first fully connected layer, a second fully connected layer, or a latent layer, the converting performed using the trained fundamental model.

15. The method of claim 14, comprising:
    utilizing the latent layer to convert a first query output, of the first fully connected layer comprising the feature description, into the binary code describing a latent semantic content of the image; and
    utilizing the second fully connected layer to encode semantic information of a second query output of the latent layer.

16. The method of claim 14, the performing a course image search comprising:

inputting the search query into the coarse image search; and generating, using the coarse image search, the search query binary code by utilizing a second query output of the latent layer.

17. The method of claim 14, the performing a fine image search comprising:

inputting the candidate group into the fine image search; and utilizing first query outputs of the first fully connected layer, using the fine image search, to rank the one or more images comprised in the candidate group.

18. The method of claim 12, the converting performed using a convolutional neural network.

19. A system for image searching, comprising:

a processor; and memory comprising processor-executable instructions that when executed by the processor cause implementation of an image searching component configured to:

convert a feature description of an image into a binary code using a trained fundamental model;

identify a candidate group, comprising one or more images, having binary codes corresponding to a second binary code; and perform a fine image search on the candidate group utilizing a second feature description to rank the one or more images within the candidate group, the candidate group comprising the image having the feature description.

20. The system of claim 19, the image searching component configured to:

responsive to the image comprising a rank above a ranking threshold, present the image to a user.

* * * * *